United States Patent
Brännström et al.

[11] Patent Number: 5,490,469
[45] Date of Patent: Feb. 13, 1996

[54] METHOD AND APPARATUS FOR HEATING THE BED MATERIAL IN A PFBC PLANT

[75] Inventors: Roine Brännström; Hjalmar Nevestveit, both of Finspong, Sweden

[73] Assignee: ABB Carbon AB, Finspongs, Sweden

[21] Appl. No.: 199,288
[22] PCT Filed: Aug. 24, 1992
[86] PCT No.: PCT/SE92/00579
   § 371 Date: Mar. 2, 1994
   § 102(e) Date: Mar. 2, 1994
[87] PCT Pub. No.: WO93/05341
   PCT Pub. Date: Mar. 18, 1993

[30] Foreign Application Priority Data

Sep. 5, 1991 [SE] Sweden .................. 9102547

[51] Int. Cl.$^6$ .................. F23C 11/02; F22B 31/00
[52] U.S. Cl. .................. 110/245; 432/15; 432/58; 431/170
[58] Field of Search .................. 110/245; 122/4 D; 431/170; 432/15, 58

[56] References Cited

U.S. PATENT DOCUMENTS

| | | | |
|---|---|---|---|
| 4,667,610 | 5/1987 | Meier et al. | 110/245 |
| 4,753,177 | 6/1988 | Engstrom et al. | 110/245 |
| 4,817,563 | 4/1989 | Beisswenger et al. | 122/4 D |
| 5,094,854 | 3/1992 | Dietz | 110/245 |
| 5,099,801 | 3/1992 | Scholl et al. | 122/4 D |
| 5,269,262 | 12/1993 | Solomen | 110/245 |

FOREIGN PATENT DOCUMENTS 0124842  11/1984  European Pat. Off. .

OTHER PUBLICATIONS

Patent Abstracts of Japan, vol. 7, No. 269, M259, abstract of JP-58-148303, publ. Sep. 3, 1982 (Kawasaki Jukogyo K.K.).
Discharge And Handling Of Solids From Pressurized Fluidized-Bed Combustors, Hanway, Jr. et al., Oct. 1982, U.S. Dept. of Energy report.

Primary Examiner—Henry C. Yuen
Assistant Examiner—Weilun Lo
Attorney, Agent, or Firm—Pollock, Vande Sande & Priddy

[57] ABSTRACT

A method of heating of bed material in a PFBC plant including a combustor and wherein bed level adjustment due to a load change is accomplished by injecting bed material into or discharging it from the combustor through feeding devices, the method including the steps of arranging two storage vessels, each adapted for injecting the bed material therefrom into the combustor and for storing bed material discharged from the combustor, and heating and maintaining the bed material in the storage vessels at the temperature corresponding to the bed temperature while maintaining the bed level of the combustor constant, by discharging bed material with the temperature of the bed from the combustor via the feeding device adapted for discharge of bed material, into one of the storage vessels with a predetermined feed speed and at the same time and at the same feed speed injecting bed material from the second storage vessel into the combustor via the feeding device adapted for injection of bed material.

7 Claims, 1 Drawing Sheet

U.S. Patent    Feb. 13, 1996    5,490,469
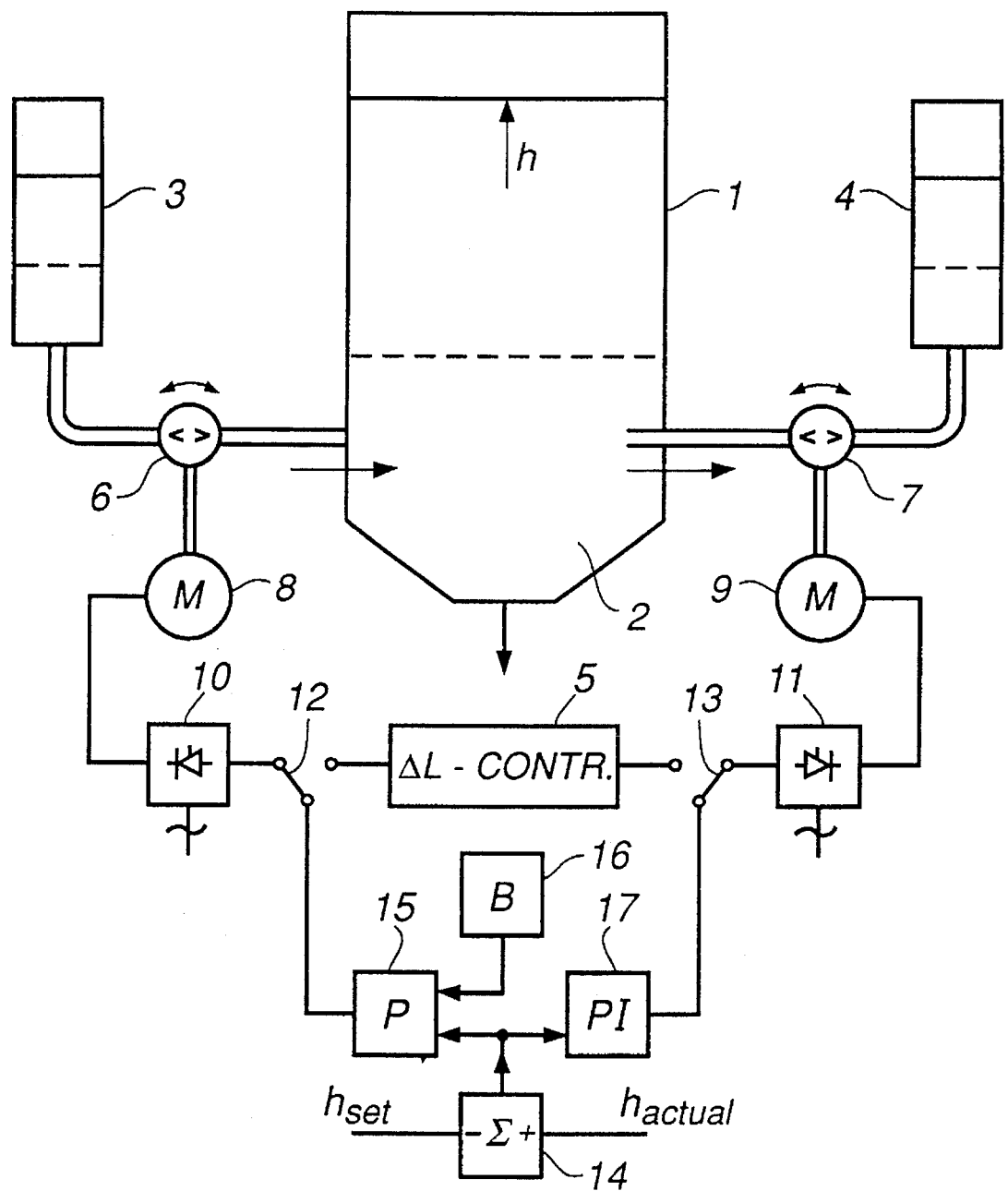

METHOD AND APPARATUS FOR HEATING THE BED MATERIAL IN A PFBC PLANT

TECHNICAL FIELD

The present invention relates to a method and to a device which constitute an integral part of a PFBC plant. Adjustment of the bed level in such a plant in connection with load changes is performed, among other things, with the aid of bed material which, from a storage vessel, is supplied to or discharged from the combustor of the plant. In order not to disturb the temperature control of the bed too much in connection with the bed level adjustment, the temperature of the supplied bed material must not differ too much from the temperature of the bed. The purpose of the invention is to heat the stored bed material by a special method such that the disturbances in the temperature control of the bed are as small as possible.

BACKGROUND OF THE INVENTION

EP 0124842 describes a "Power plant with a combustor with a fluidized bed". The combustor burns the fuel supplied to the fluidized bed. The plant is provided with means for adjusting the bed level in dependence on the operating conditions by the transfer of bed material from the combustor to a storage vessel and vice versa, wherein the storage vessel for bed material is connected to the combustor by means of discharge and reinjection conduits and the storage vessel is connected, via a conduit provided with a valve, to a space with a pressure lower than that in the combustor, and wherein the reinjection conduit is connected, via a conduit provided with a valve, to a pressure gas source, the pressure of which is higher than the pressure in the combustor. Both the combustor and storage vessel of the plant are enclosed within a pressure vessel.

Otherwise, the prior art regarding means for handling bed material in plants with a combustor with a fluidized bed is described in detail in a report ANL/CEN/FE-81-3 from Argonne National Laboratory, Argonne, Ill., entitled "Discharge and Handling of Solids from Pressurized Fluidized Bed Combustors" by John E. Hanway Jr. and W. F. Podolski.

A PFBC plant comprises a large number of more or less interdependent control systems with various forms of external limitations. An important control system in this connection is the control which is designed to keep the bed at a constant temperature of about 850 degrees centigrade independently of the output of power from the plant.

There is a relatively clear-cut relationship between the available power output from the plant and the bed level. To be able to maintain a constant power output, there must be a continuous supply of the coal mixture which is burnt. The ashes which are then generated tend to increase the amount of bed material in the bed, whereby the bed level tends to rise. The fact that this does not take place is due to the fact that a bed level control with a set value corresponding to the desired and current bed level ensures that an amount of bed material is discharged which is equal to the production of new bed material during combustion.

When a load change occurs, the bed level needs to be changed to be adapted to the new load condition. Since the production of new bed material in spite of all is relatively modest, the rate of increase which would be obtained in the bed if the discharge of bed material were stopped is normally far from sufficient to provide the desired speed of the bed level change in case of an increased load requirement. It is true that, in case of a reduction of load, the speed of the bed material discharge could be increased; however, such a method alone could not generally take care of load changes. As is clear from the above, in the method disclosed in the EP patent the bed level is adjusted upon a load change by injecting more bed material from the storage vessel in case of increased power requirement in order thus to raise the bed level, and that bed material is sucked out from the bed to be able to lower the bed level.

The above is, per se, a simple, relatively fast and safe method for adjusting the bed level upon a load change. However, this method imposes very high demands on the temperature control of the bed, in fact so high demands that it is a factor limiting the rate at which load changes can take place. The reason for this is that, although the storage vessel of the bed material is located inside the pressure vessel, the bed material stored in the storage vessel has a considerably lower temperature than the bed. To reduce the disturbing influence on the temperature control which is caused by this injection and discharge of bed material, it would be desirable if the bed material in the storage vessel had a temperature which largely corresponds to the bed temperature. A heating of the bed material may, of course, be performed in a plurality of different ways. The present invention describes an alternative way of heating the bed material in the storage vessel while utilizing the heat storage constituted by the bed itself.

SUMMARY OF THE INVENTION

A device for heating bed material according to the present invention comprises two parallel working, identical storage vessels. Upon a load increase, bed material is injected from the two vessels into the bottom of the bed to rapidly raise the bed level. In a corresponding way, bed material is discharged from the bottom of the bed and back to the two vessels upon a load decrease. The collected bed material located in the two vessels corresponds to half of the total volume of the vessels and in a conceived initial position both vessels are half-filled. The vessels are provided with minimum and maximum limitations with respect to the volume of the bed material.

Heating of bed material and maintenance of the temperature of the bed material at a temperature largely corresponding to the bed temperature take place under the operating conditions when the load or the power output is practically constant. As is clear from the above, constant load means that the bed level is to be constant. By injecting bed material into the bottom of the bed from one of the storage vessels, hereinafter in the description called the first storage vessel, and at the same time discharging an equal amount of the bed material located in the bottom of the bed, with the temperature of the bed, into the other vessel, the bed level will remain constant corresponding to the current constant power output. Warm bed material will then be supplied to the second storage vessel. When this vessel starts to be filled, or when the bed material in the first vessel starts to approach its lower limitation, the direction of the bed flow is changed such that bed material from the second vessel is reinjected into the bed and an equal amount of bed material is discharged from the bed and supplied to the first vessel. The sequence of change is interrupted when the level of the bed material in the two storage vessels has become equally high.

Ensuring that the bed level in the combustor remains constant while performing simultaneous injection and discharge to and from the storage vessels requires a control system which ensures that injected and discharged bed material is at all times equal. The invention therefore includes an interdependent control system between the injection and discharge devices which is activated when the bed material in the storage vessels needs to be heated, that is, when the temperature of the stored bed material drops below a predetermined value. The speed of injection of bed material from the first vessel to the bed is mainly controlled by a bias signal which, via a P-connected amplifier, supplies the necessary control signal to the injection device. This control is included in an external bed level control with a locked set value. This locked set value corresponds to the load prevailing at the beginning of the heating process. The actual value of the bed level control is equal to the bed level continuously measured during the heating process. The deviation between these two values is supplied both to the P-connected amplifier, connected in opposition to the bias signal, and to a PI-connected amplifier, the output signal of which supplies the necessary control signal to the discharge device from the bed, that is, the injection device for the second vessel.

When the heating sequence is activated, the set and actual values for the bed level are equal and, consequently, the control deviation is zero. It is then the set value of the bias signal which, via the P-connected amplifier, supplies a control signal for the injection speed for bed material from the first vessel and into the bed. The injection results in a tendency of the bed level to rise and gradually a control deviation occurs between the locked set value and the actual value. As soon as a control deviation arises, the discharge device will start in dependence on a signal of the PI-connected amplifier. At the same time, the control deviation will reduce the injection speed via the P-connected amplifier. In this way, after some time, injection and discharge will operate with the same rate of feed.

The sequence during heating may either be started manually or automatically when the temperature of the bed material in the first or second vessel has become too low, provided that the power output from the plant is constant.

If an order to change the bed-level because of a load change arrives from a superordinate control, this load change may be either delayed until the heating process is completed, or the heating process may be interrupted. The purpose of the limitations for the vessels as regards the maximum and minimum levels of bed material is to have, under all conditions, available bed material and available space in any of the vessels for injection and discharge of bed material to adapt to the new power requirement.

The use of two storage vessels, as shown above, allows the bed material which upon a load change is supplied to the bed to have largely the same temperature as the remaining part of the bed. This means that the temperature control of the bed is disturbed to a considerably lesser degree than when using the technique described, for example, in EP 0124842. This is, of course, of great importance for the dimensioning of the temperature control and provides great advantages in relation to the prior art.

BRIEF DESCRIPTION OF THE DRAWINGS

The sole FIGURE shows a part of a PFBC plant which deals with injection and discharge of bed material in connection with load changes.

DESCRIPTION OF THE PREFERRED EMBODIMENTS

The accompanying single FIGURE shows that part of a PFBC plant which deals with injection and discharge of bed material in connection with load changes. The bed inside a combustor 1 has a bed level equal to h. Upon a load change ΔL, the bed level is adjusted by injection or discharge of bed material 2 from two storage vessels 3 and 4. When the load is increased, the bed material is to be injected into the lower part of the combustor from the two storage vessels and in a corresponding way, when the load is decreased, bed material is to be discharge from the lower part of the combustor into the two storage vessels. This is handled by a ΔL control 5.

In a PFBC plant according to the Figure, injection and discharge of bed material to and from the combustor takes place by means of screw feed devices 6 and 7 which are each driven by a motor 8 and 9 and power members 10 and 11. Another method for injection and discharge comprises introducing valves in the feed conduits between the storage vessels and the combustor and, in connection with injection after having opened these valves, supplying an overpressure to the storage valves and providing a sub-atmospheric pressure in the vessels in connection with discharge. Both the ΔL control and the method for heating the bed material according to the invention are independent of the manner in which injection and discharge of bed material are performed but assume that there are two storage vessels for bed material. When changing between normal load control and heating control, the control signals to the power members 10 and 11 are switched with the aid of the switches 12 and 13 between the ΔL control and the heating control.

As will have been clear from the description, a load change of the plant requires adjustment of the bed level. The adjustment is performed by the above-mentioned injection or discharge of bed material to or from the combustor. It is also clear from the above that it is important that the temperature of the bed is not changed too much, which may very well happen when bed material is supplied to or discharged from the combustor. Thus, it is highly desirable that the material which is injected into the combustor has a temperature which is as close to the bed temperature as possible. The invention therefore comprises a method which, with the aid of the two vessels and the heat storage constituted by the bed, heats the bed material such that this material when being injected into the combustor has a temperature which corresponds well to the temperature of the bed.

The heating process is adapted so as not to disturb a load equalization process. Therefore, the heating only takes place when the load is practically constant. It is thus important that a constant bed level be maintained during the heating process. For this purpose an external bed level control is provided during the heating, and this control ensures that the bed level prevailing when the heating sequence starts remains practically constant. The value of the bed level at the start of the heating is locked as a set value for the bed level control during the entire heating process. This value is compared in a summator 14 with the current value of the bed level at all times during the heating.

When the heating process starts, the feed device for the storage vessel from where bed material is to be injected into the bed, that is, from storage vessel 3, the first storage vessel, in the operating state shown in the Figure, receives a control signal from a P-connected amplifier with a bias input signal 16, whereby the injection into the bed is initiated. This means that the current value of the bed level starts increasing and a control deviation occurs in the form of an output signal from the summator 14. The control deviation signal is integrated into the PI-connected amplifier 17, whereby also the discharge device from the bed, that is, the injection device to the second storage vessel 4, receives a control signal and the discharge from the bed starts. The control deviation signal is also supplied to the P-connected amplifier with such a polarity that the speed of injection of bed material to the bed is reduced. This means that the injection speed and the discharge speed of bed material to and from the bed approach one and the same value corresponding to the bias obtained from the setting device 16 and that this value is reached after a short synchronization time.

When bed material during the heating is to be moved in a direction opposite to that described above, that is, from the second storage vessel 4 via the bed to the first storage vessel 3, the control signal is connected from the P-connected amplifier 15 to the power member 11 for operation of the feed device associated with this second storage vessel in the opposite direction while at the same time the control signal is connected, via the PI-connected amplifier, to the power member 10 for the first storage vessel.

We claim:

1. A method of heating bed material in a PFBC plant having a combustor and in which bed level adjustment due to a load change is accomplished by injecting or withdrawing bed material into/from said combustor, said heating method including the steps of:

1) heating and storing bed material in at least two storage vessels to maintain said bed material available for bed level adjustment at a temperature substantially corresponding to the bed material temperature;

wherein said heating step includes:

a) positioning feeding devices between each of said storage vessels and the combustor;

b) feeding out bed material from said combustor through one of said feeding devices into one of said at least two storage vessels;

c) feeding into said combustor equal amounts of bed material from another of said storage vessels through another of said feeding devices simultaneously with said step a);

d) performing said feeding out and feeding into at the same speed; and 2) maintaining constant bed level of the combustor during said heating.

2. A method for heating of bed material in a PFBC plant according to claim 1 wherein said bed material is only heated when the load of the PFBC plant is constant.

3. A method for heating of bed material in a PFBC plant according to claim 1 wherein heating of bed material is interrupted when the bed level of the combustor needs to be adjusted because of a change of load.

4. A method for heating of bed material in a PFBC plant according to claim 1 wherein the bed level of the combustor is maintained constant during the heating by a bed level control, the set value of the bed level being maintained constantly equal to the bed level when the heating starts and the actual value of which is a continuously measured value of the current bed level.

5. A method for heating of bed material in a PFBC plant according to claim 1 wherein the speed of injection and discharge of bed material to and from the combustor is determined by an internal bias setting in the bed level control.

6. A method of heating of bed material in a PFBC plant including a combustor and wherein bed level adjustment due to a load change is accomplished by injecting bed material into or discharging it from the combustor through feeding devices, said method including the steps of:

arranging at least two storage vessels in communication with the combustor, each adapted for injecting bed material therefrom to the combustor and for storing therein bed material discharged from the combustor;

heating and maintaining temperature of the bed material in the storage vessels at a temperature substantially corresponding to the bed temperature by:

a) injecting bed material into the bed from one of the storage vessels while simultaneously discharging equal amounts of bed material from the combustor into the other storage vessel;

b) reversing the direction of the bed material flow when the amount of bed material in one of the storage vessels reaches minimum or maximum volume limitation; and c) controlling simultaneous injection and discharge of the equal amount of bed material between the storage vessels and the combustor to ensure constant bed level in the combustor.

7. An apparatus for heating bed material in a PFBC plant having a combustor and in which bed level adjustment due to a load change is accomplished by injecting or withdrawing bed material into/from said combustor, said heating apparatus including:

a) at least two storage vessels for storing bed material available for said bed level adjustment at a temperature substantially corresponding to the bed material temperature;

b) feeding devices between each of said storage vessels and the combustor designed for feeding bed material out and into each of said storage vessels;

c) controlling means for controlling any one of said feeding devices to feed out bed material from said combustor at a predetermined speed and for simultaneously controlling another feeding device to feed an equal amount of the bed material into said combustor at the same predetermined speed, while maintaining constant bed material level in said combustor to thereby heat and maintain said bed material in said storage vessels at said temperature substantially corresponding to the bed material temperature.

* * * * *